United States Patent
Dimov

(10) Patent No.: US 10,872,124 B2
(45) Date of Patent: Dec. 22, 2020

(54) SEARCH ENGINE

(71) Applicant: SAP SE, Walldorf (DE)

(72) Inventor: Stefan Dimov, Mountain View, CA (US)

(73) Assignee: SAP SE, Walldorf (DE)

( * ) Notice: Subject to any disclaimer, the term of this patent is extended or adjusted under 35 U.S.C. 154(b) by 247 days.

(21) Appl. No.: 16/020,051

(22) Filed: Jun. 27, 2018

(65) Prior Publication Data

US 2020/0004883 A1    Jan. 2, 2020

(51) Int. Cl.
*G06F 16/00* (2019.01)
*G06F 16/9535* (2019.01)
*G06F 16/901* (2019.01)
*G06F 16/2457* (2019.01)

(52) U.S. Cl.
CPC .... *G06F 16/9535* (2019.01); *G06F 16/24578* (2019.01); *G06F 16/9024* (2019.01)

(58) Field of Classification Search
CPC ........... G06F 16/9535; G06F 16/24578; G06F 16/9024; G06F 16/00; G06F 16/30867; G06F 17/30958; G06F 17/3053; G06F 17/30; G06F 16/223; G06F 16/216; G06F 16/23; G06F 16/2237; G06F 11/3003; G06F 16/2228; G06F 16/901; G06F 16/22; G06F 11/30; G06F 16/2246; G06F 16/284; G06F 16/2264; G06F 16/2455; G06F 17/30598; G06F 17/30321; G06F 17/30327

See application file for complete search history.

(56) References Cited

U.S. PATENT DOCUMENTS

| | | | |
|---|---|---|---|
| 2006/0206412 A1* | 9/2006 | Van Luchene | G06Q 30/0633 705/37 |
| 2009/0144259 A1* | 6/2009 | Sundaresan | G06F 16/3334 |
| 2013/0036124 A1* | 2/2013 | Ambwani | G06F 16/7844 707/749 |
| 2014/0225899 A1* | 8/2014 | Bekmambetov | G06F 40/186 345/473 |
| 2015/0050446 A1* | 2/2015 | Stamp | B29C 43/52 428/73 |
| 2015/0287080 A1* | 10/2015 | Geetha | G06Q 30/0256 705/14.54 |
| 2016/0217509 A1* | 7/2016 | Eggleston, IV | G06Q 20/209 |
| 2016/0232543 A1* | 8/2016 | Govindarajan | G06Q 30/0202 |
| 2017/0212931 A1* | 7/2017 | Chen | G06F 16/245 |
| 2017/0213130 A1* | 7/2017 | Khatri | G06N 3/0445 |
| 2019/0155877 A1* | 5/2019 | Sharma | G06F 40/30 |

* cited by examiner

*Primary Examiner* — Anh Ly
(74) *Attorney, Agent, or Firm* — Mintz Levin Cohn Ferris Glovsky and Popeo, P.C.

(57) ABSTRACT

A method may include receiving, at a search engine, a search phrase. The search engine may query a database in response to receiving the search phrase. The search engine may query the database to retrieve, from the database, one or more item descriptions matching the search phrase. The one or more item descriptions may include an item description based on a relevance score of the item description. The relevance score of the item description may correspond to a prominence score of each word in the item description that also appear in the search phrase. The search engine may generate a search result that includes items associated with the item descriptions retrieved from the database. Related systems and articles of manufacture, including computer program products, are also provided.

16 Claims, 7 Drawing Sheets

300

| | Word | Prominence Score |
|---|---|---|
| Item Description I | Scandinavian | 1 |
| | Cherry | 1 |
| | Dining | 3 |
| | Table | 100 |
| Item Description II | Scandinavian | 1 |
| | Walnut | 1 |
| | Dining | 3 |
| | Chair | 100 |
| Item Description III | Biedermeier | 1 |
| | Walnut | 1 |
| | Dining | 3 |
| | Chair | 100 |

FIG. 3A

Semantic Search

| | |
|---|---|
| ipad case red leather | Search |

310

| Product Id | Product Extended Name |
|---|---|
| xxxxxxxxxxxx | XXX XXX Folio Case for iPad mini 1, 2, & 3 (Dark Poppy Red/Slate Gray); supplier: XXX ; manufacturer: XXX ; Color: Dark Poppy Red / Gray; CASES COMPUTER-Screen Size Max: 7.9 in.; CASES COMPUTER-Closure Type: Magnetic; CASES COMPUTER-Case Type: Portfolio only; CASES COMPUTER-Color: Red; CASES COMPUTER-Interior: Microfiber; CASES COMPUTER-Material: Faux Leather; CASES COMPUTER-Model Type: iPad mini |
| xxxxxxxxxxxx | XXX XXX Folio Case for iPad Pro 9.7 in. (Red); supplier: XXX ; manufacturer: XXX ; Color: Red; CASES COMPUTER-Screen Size Max: 9.7 in.; CASES COMPUTER-Closure Type: Folding; CASES COMPUTER-Case Type: Portfolio; CASES COMPUTER-Color: Red; CASES COMPUTER-Interior: Soft non-scratch; CASES COMPUTER-Material: Faux Leather; CASES COMPUTER-Model Type: iPad Pro 9.7 in. |
| xxxxxxxxxxxx | XXX XXX Case with Rotational Support for iPad Pro 9.7 in. (Red); supplier: XXX ; manufacturer: XXX ; Color: Red; CASES COMPUTER-Screen Size Max: 9.7 in.; CASES COMPUTER-Closure Type: Magnetic; CASES COMPUTER-Case Type: Rotating Base; CASES COMPUTER-Color: Red; CASES COMPUTER-Interior: Soft non-scratch; CASES COMPUTER-Material: Faux Leather; CASES COMPUTER-Model Type: iPad Pro 9.7 in. |
| xxxxxxxxxxxx | XXX XXX Executive Case for Apple iPad Pro (Red); supplier: XXX ; manufacturer: XXX ; Color: Red; CASES COMPUTER-Screen Size Max: 12.9 in.; CASES COMPUTER-Closure Type: Snap; CASES COMPUTER-Case Type: Portfolio only; CASES COMPUTER-Color: Red; CASES COMPUTER-Interior: Microfiber; CASES COMPUTER-Material: Leather; CASES COMPUTER-Model Type: iPad Pro 12.9 in.; CASES COMPUTER-Features: Stylus Holder |

Prev | Page #1 out of 1 | Next | Overall 4 products Go to page # 0

FIG. 3B

Search Semantics - Head-Word and Attributes

| ipad case | | |
|---|---|---|
| UNSPSC | Head-Word | Attribute Name/Value Pairs |
| 43211706 | case | {"CASES COMPUTER-Case Type": "Keyboard case"}, {"CASES COMPUTER-Model Type": "iPad mini"}, {"CASES COMPUTER-Model Type": "iPad mini"}, {"COMPUTERS PERI-Tablet Compatibility": "iPad mini"}, {"COMPUTERS PERIPHERALS-Interface": "iPad"}, {"COMPUTERS PERIPHERALS-Platform": "iPad"} |

{"unspsc": "43211706", "headWord": ["case"], "attributes": [{"CASES COMPUTER-Case Type": "Keyboard case"}, {"CASES COMPUTER-Model Type": "iPad mini"}, {"COMPUTERS PERI-Tablet Compatibility": "iPad mini"}, {"COMPUTERS PERIPHERALS-Interface": "iPad"}, {"COMPUTERS PERIPHERALS-Platform": "iPad"}]}

Get Semantics

SEARCH ENGINE

TECHNICAL FIELD

The subject matter described herein relates generally to database processing and more specifically to processing fuzzy database queries.

BACKGROUND

A database (e.g., a relational database, a non-relational database, and/or the like) may be configured to store a plurality of electronic data records. These data records may be organized into various database objects including, for example, database tables, graphs, and/or the like. The database may be coupled with a database management system (DBMS) that supports a variety of operations for accessing the data records held in the database. These operations may include, for example, structure query language (SQL) statements, a graph query language statement, and/or the like.

SUMMARY

Systems, methods, and articles of manufacture, including computer program items, are provided for a fuzzy database queries. In one aspect, there is provided a system. The system may include at least one data processor and at least one memory. The at least one memory may store instructions that cause operations when executed by the at least one data processor. The operations may include: receiving, at a search engine, a search phrase; in response to receiving the search phrase, querying, by the search engine, a database to at least retrieve, from the database, one or more item descriptions matching the search phrase, the one or more item descriptions including a first item description based at least on a first relevance score of the first item description, the first relevance score of the first item description corresponding to a prominence score of each of one or more words in the first item description that also appear in the search phrase, and the prominence score of each of the one or more words in the first item description corresponding to a relative significance of each of the one or more words; and generating, by the search engine, a search result that includes items associated with the one or more item descriptions retrieved from the database.

In some variations, one or more features disclosed herein including the following features can optionally be included in any feasible combination. The one or more item description may include the first item description but not a second item description based at least on the first relevance score of the first item description exceeding a threshold value and a second relevance score of the second item description not exceeding the threshold value. The threshold value may be equal to and/or greater than a prominence score of assigned to a headword in at least one item description in the database. The headword of the at least one item description may a word having a greatest significance by at least providing a basic description of a corresponding item. The threshold value being equal to and/or greater than the prominence score assigned to the headword in at least one item description may prevent the one or more item descriptions from including the at least one item description if the headword of the at least one item description does not appear in the search phrase.

In some variations, the one or more item descriptions may include the first item description but not a second item description based at least on the first item description being one of a certain quantity of item descriptions in the database having a highest relevance scores and the second item description not being one of the certain quantity of item descriptions in the database having the highest relevance scores.

In some variations, the one or more item descriptions may include the first item but not a second item description based at least on the first relevance score being equal to a second relevance score of the second item description and the first item description including a larger quantity of words matching the search phrase than the second item description.

In some variations, the database may be a relational database. The search engine may query the database by at least sending, to the database, one or more structured query language (SQL) statements.

In some variations, the database may be a graph database. The search engine may query the database by at least sending, to the database, one or more graph query language statements.

In some variations, the search phrase may be preprocessed by at least eliminating variations of one or more words in the search phrase.

In some variations, the search phrase may be preprocessed by at least replacing and/or supplementing a first word in the search phrase with a second word. The second word may be a synonym and/or a hypernym of the first word.

In some variations, the search phrase may be preprocessed by at least replacing an incorrect word in the search phrase with a correct word. The correct word may be identified by at least applying, to the incorrect word, a distance algorithm.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A depicts a table illustrating the prominence score assigned to words in different item descriptions, in accordance with some example embodiments;

FIG. 3B depicts a table illustrating a search result, in accordance with some example embodiments;

FIG. 3C depicts table illustrating a result of performing semantic analysis on a search phrase, in accordance with some example embodiments;

When practical, similar reference numbers denote similar structures, features, or elements.

DETAILED DESCRIPTION

Figure 1:
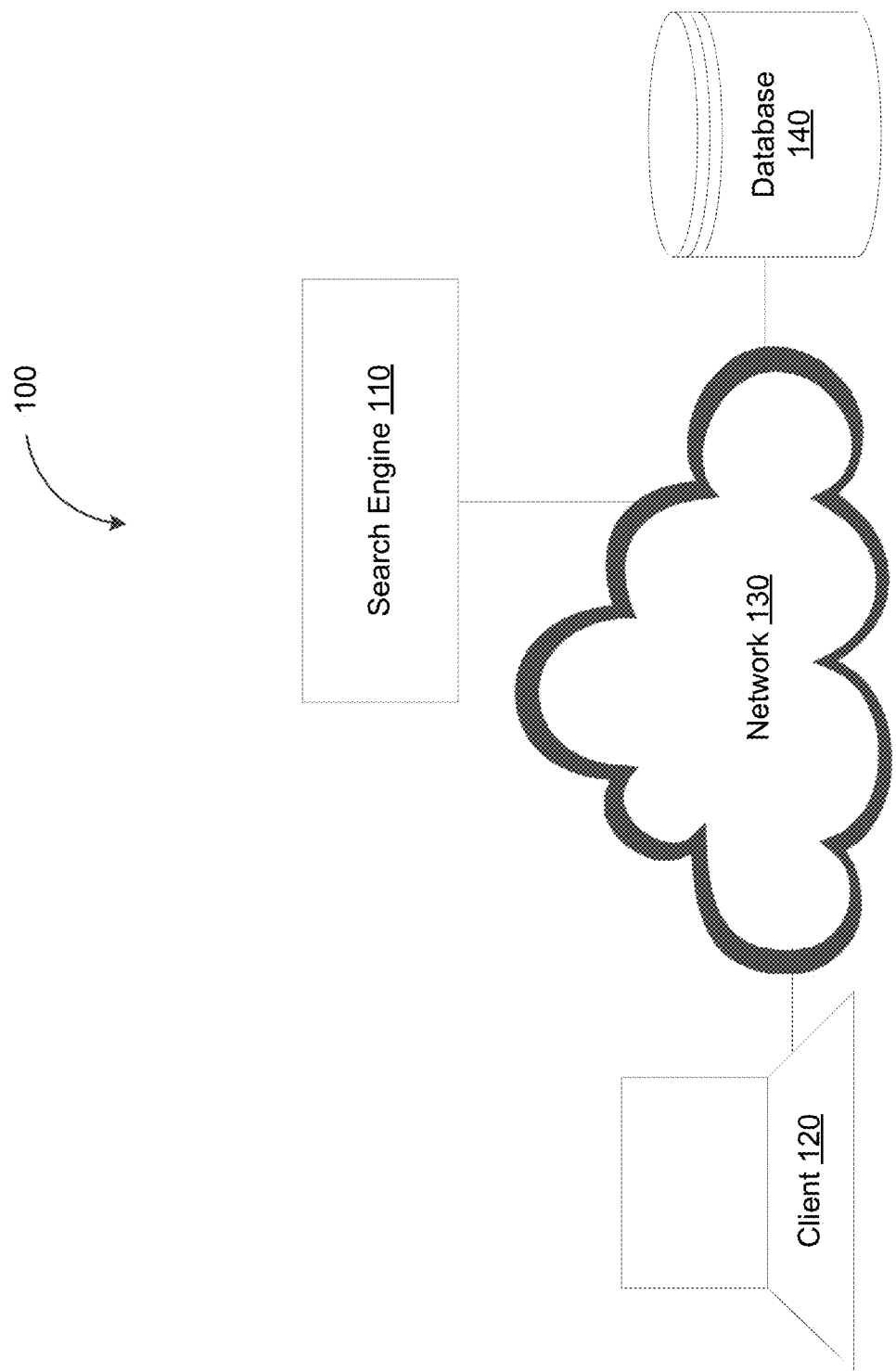
FIG. 1 depicts a system diagram illustrating a search system, in accordance with some example embodiments.

A search engine may be configured to identify one or more items that match a search phrase. For example, a user may input, into the search engine, a search phrase describing an item such as, for example, a product, a service, and/or the like. The search phrase may include one or more words. In response to the receiving the search phrase from the user, the search engine may query, based on the search phrase, a database storing a plurality of item descriptions. Each item description stored in the database may correspond to an item. Furthermore, each item description may also include one or more words. As such, a conventional search engine may identify items that match the search phrase based on a quantity of words in each item description that match the words appearing in the search phrase. However, the quantity of matching words may not be an accurate indicator of relevancy. For instance, even though most of the words appearing in the item description "Scandinavian cherry dining chair" match the words in the search phrase "Scandinavian cherry dining table," the item associated with the item description may still be irrelevant to the search phrase. Thus, identifying matching items based on a quantity of matching words may often return items have little or no relevance to the search phrase.

In some example embodiments, a search engine may be configured to identify one or more items that match a search phrase based on the relevance of the matching words that appear in the search phrase and in each of a plurality of item descriptions stored in a database. For example, each word in an item description may be associated with a prominence score. The prominence score assigned to a word appearing in an item description may indicate the significance of that word relative to other words appearing in the same item description. For instance, the most significant word in an item description may be referred to as a headword. The headword may be one or more words that provide the most basic description of an item (e.g., table, chair, and/or the like) whereas other words in the item description may relate to attributes of the item (e.g., Scandinavian, cherry, dining, and/or the like). It should be appreciated that an item description may include additional words that provide neither a description nor an attribute for the corresponding item. These additional words may also be used by the search engine when identifying items that match the search description.

In some example embodiments, the search engine may respond to the receipt of a search phrase from a user by at least querying the database to retrieve, from the database, one or more item descriptions matching the search phrase. Each of the matching item description retrieved from the database may be associated with a relevance score corresponding to a combined prominence score of the words in the item description that match a word in the search phrase. As such, instead of and/or in addition to the quantity of matching words, the search engine may identify items that match the search phrase based on the relevance score of the corresponding item descriptions. For instance, the search engine may determine that an item description matches the search phrase if the relevance score of the item description exceeds a threshold value. This threshold value may be adjusted, for example, to be equal to and/or greater than the prominence score assigned to headwords, thereby ensuring that the headword of an item description must appear in the search phrase in order for the item description to be selected as a matching item description. Alternatively and/or additionally, the search engine may select a quantity of item descriptions having the highest relevance score. Accordingly, even though a first item description may include a larger quantity of matching words than a second item description, the search engine may nevertheless determine that the second item description is a match for the search phrase if the second item description has a higher relevance score than the first item description.

FIG. 1 depicts a system diagram illustrating a system 100, in accordance with some example embodiments. Referring to FIG. 1, the search system 100 may include a search engine 110 that is communicatively coupled with a client 120 and a database 140. It should be appreciated that the client 120 may be any type of processor and memory based device including, for example, a cellular phone, smart phone, a tablet, a laptop computer, a desktop, a workstation, and/or the like. Meanwhile, the network 130 may be any wired and/or wireless network including, for example, a public land mobile network (PLMN), a local area network (LAN), a wide area network (WAN), a virtual local area network (VLAN), the Internet, and/or the like. The database 140 may be any type of database including, for example, a graph database, an in-memory database, a relational database, a non-SQL (NoSQL) database, and/or the like.

The database 140 may store item descriptions for a plurality of items. The item description for an item may include one or more words. Furthermore, each word in the item description may be assigned a prominence score corresponding to the significance of that word relative to other words in the item description. For instance, at least one word in the item description may provide a basic description of the item. This word may be the headword of the item description and may therefore be assigned the highest prominence score. Alternatively and/or additionally, one or more other words in the item description may relate to attributes of the item. These words may be assigned lower prominence scores. For example, the prominence score assigned to a word relating to an attribute of the item may be lower than the prominence score assigned to the headword. Furthermore, the prominence score assigned to a first word relating to a first attribute of the item may be higher (or lower) than the prominence score assigned to a second word relating to a second attribute of the item depending on the relative importance of the first attribute and the second attribute.

According to some example embodiments, the search engine 110 may identify items that match a search phrase received from the client 120 by at least querying the database 140 to retrieve one or more item descriptions. For instance, the search engine 110 may query the database 140 to retrieve a list of matching item descriptions, which may be sorted based at least on a relevance score for each of the matching item descriptions. An item description may match the search phrase if the item description include at least one word that appears in the search description. The relevance score for that item description may correspond to a combined prominence score of the words in the item description that match words appearing in the search phrase.

In some example embodiments, the search engine 110 may receive, from the client 120, a search phrase that include one or more words. In response to receiving the search phrase from the client 120, the search engine 110 may preprocess the search phrase. For instance, the preprocessing of the search phrase may include tokenizing the search phrase into individual words. The search phrase may also be cleaned to remove stop words, numerical digits, non-alphabet symbols, and/or the like. Alternatively and/or additionally, the preprocessing of the search phrase may include supplementing and/or replacing one or more words from the search phrase with synonyms and/or hypernyms, which may be more general than the original words. The search engine 110 may further stem and/or lemmatize the search phrase to eliminate multiple variations (e.g., inflected forms and/or the like) of the same word.

In some example embodiments, the preprocessing of the search phrase can further include resolving typographical errors appearing in the search phrase. For example, the search engine 110 may encounter an incorrect word in the search phrase (e.g., "aple" instead of "apple," "code" instead of "core," and/or the like). In response to the presence of an incorrect word, the search engine 110 may identify one or more correct words by at least identifying words that are a threshold distance away from the incorrect word. For instance, the search engine 110 may identify the correct words by applying, to an incorrect word, a distance algorithm including, for example, Levenstein distance, and/or the like. The search engine 110 may further replace the incorrect words with the correct words before querying the database 140 using the preprocessed search phrase. That is, the search engine 110 may query the database 140 to retrieve item descriptions that match the preprocessed search phrase containing the correct words instead of the original search phrase including the incorrect words.

In some example embodiments, the search engine 110 may query the database 140 to retrieve, from the database 140, one or more item descriptions that match the preprocessed search phrase. Furthermore, the search engine 110 may identify, based at least on the matching item descriptions retrieved from the database 140, one or more items matching the search phrase received from the client 120. For instance, the search engine 110 may send, to the database 140, a query to return a list of matching item descriptions, which may be sorted based on a relevance score associated with each of the matching item descriptions. To further illustrate, Table 1 below depicts an example of a query that the search engine 110 may send to the database 140.

TABLE 1

```
CREATE PROCEDURE MATCH_SEMANTICS2(IN phrase_words_json VARCHAR(5000))
READS SQL DATA AS
BEGIN
    DECLARE phrase_words TABLE (WORD VARCHAR(200));
    phrase_words = SELECT DISTINCT WORD
                    FROM JSON_TABLE(:phrase_words_json,
                        '$.elements[*]'
                        COLUMNS (WORD VARCHAR(200)
PATH '$'));
    SELECT DISTINCT PA.CNT, HW_CNT,
            HWS,
                CONCAT('{',
                CONCAT(ST.STR,
                CONCAT(', ',
                CONCAT(PA.AT, '}')))) "JSON"
    FROM ( SELECT PROD_ID,
                COUNT(WORD) "HW_CNT",
                STRING_AGG (WORD, ','ORDER BY WORD) HWS,
                    CONCAT('"unspsc": "',
                    CONCAT (unspsc,
                    CONCAT('", "headword": [',
                    CONCAT(STRING_AGG( CONCAT('"',
CONCAT( WORD, '"')), ' ,'ORDER SY WORD) , ']')))) "STR"
            FROM PRODUCT_SEMANTICS
            WHERE SEM_TYPE = 'product'
            GROUP BY PROD_ID, UNSPSC) "ST"
        INNER JOIN
        (SELECT PROD_ID, IFNULL(CONCAT('"attributes": [', CONCAT( STRING_AGG(AGG,
', 'ORDER EY AGG), ']')),'"attributes": [ ]') "AT", COUNT(PROD_ID) "CNT" FROM
            (SELECT PS.PROD_ID,
                CONCAT(CONCAT('{"', PS.ATTR_NAME), CONCAT('":
"',CONCAT(PS.ATTR_VAL, '"}'))) "AGG"
                FROM (SELECT PROD_ID, PROD_TITLE, COUNT(DISTINCT WORD) "WC"
    FROM PRODUCT_SEMANTICS
                WHERE
                    WORD IN
                        (SELECT WORD FROM :phrase_words)
                    AND PROD_ID IN
```

TABLE 1-continued

```
                    (SELECT PROD_ID FROM PRODUCT_SEMANTICS
                         WHERE WORD IN
                              (SELECT WORD FROM
:phrase_words)
                              AND SEM_TYPE = 'product')
                    GROUP BY PROD_ID, PROD_TITLE
                    HAVING COUNT(DISTINCT WORD) = (SELECT TOP 1
COUNT(DISTINCT WORD) FROM PRODUCT_SEMANTICS
    WHERE
         WORD IN (SELECT WORD FROM :phrase_words)
         AND PROD_ID IN
              (SELECT PROD_ID FROM PRODUCT_SEMANTICS
                   WHERE
                        WORD IN (SELECT WORD FROM :phrase_words)
                        AND SEM_TYPE = 'product')
GROUP BY PROD_ID
ORDER BY COUNT(DISTINCT WORD) DESC)
                    ORDER BY COUNT(DISTINCT WORD) DESC) "PIDS"
                         INNER JOIN
                    (SELECT PROD_ID,
                         (CASE WHEN ATTR_TYPE = 'N' THEN ATTR_NAME
ELSE NULL END) "ATTR_NAME",
                         ATTR_VAL,
                         WORD
                    FROM PRODUCT_SEMANTICS) "PS"
                         ON PIDS.PROD_ID = PS.PROD_ID
              WHERE
                    PS.WORD IN (SELECT WORD FROM :phrase_words)
                    GROUP BY PS.PROD_ID, PS.ATTR_NAME, PS.ATTR_VAL
                    ORDER BY PS.PROD_ID)
         GROUP BY PROD_ID
         HAVING COUNT (PROD_ID) >=
              (SELECT MAX(CNT) FROM
                   (SELECT COUNT(PROD_ID) "CNT" FROM
                        (SELECT DISTINCT PS.PROD_ID
                         FROM (SELECT PROD_ID FROM
PRODUCT_SEMANTICS
                                   WHERE
                                        WORD IN
                                             (SELECT WORD FROM
:phrase_words)
                                        AND PROD_ID IN
                                             (SELECT PROD_ID FROM
PRODUCT_SEMANTICS
                                                  WHERE WORD IN
                                                       (SELECT
WORD FROM :phrase_words)
                                                  AND
SEM_TYPE = 'product')
                                   GROUP BY PROD_ID, PROD_TITLE
                                   HAVING COUNT(DISTINCT WORD) =
(SELECT TOP 1 COUNT(DISTINCT WORD) FROM PRODUCT_SEMANTICS
                              WHERE
                                   WORD IN (SELECT WORD FROM :phrase_words)
                                   AND PROD_ID IN
                                        (SELECT PROD_ID FROM PRODUCT_SEMANTICS
                                             WHERE
                                                  WORD IN (SELECT WORD FROM
:phrase_words)
                                             AND SEM_TYPE = 'product')
                         GROUP BY PROD_ID
                         ORDER BY COUNT(DISTINCT WORD) DESC)
                              ORDER BY COUNT(DISTINCT WORD)
DESC) "PIDS"
                              INNER JOIN
PRODUCT_SEMANTICS "PS"
                                   ON PIDS.PROD_ID =
PS.PROD_ID
                              WHERE
                                   PS.WORD IN (SELECT WORD FROM
:phrase_words)
                              GROUP BY PS.PROD_ID, PS.ATTR_NAME,
PS.ATTR_VAL
                              ORDER BY PS.PROD_ID)
                         GROUP BY PROD_ID
                         ORDER BY CNT DESC))
```

TABLE 1-continued

```
    ORDER BY CNT DESC) "PA"
    ON ST.PROD_ID = PA.PROD_ID
    ORDER BY PA.CNT DESC, HW_CNT DESC;
END;
```

As noted, the relevance score for an item description may correspond to a combined prominence score of each word in the item description that match a word in the search phrase. Meanwhile, the prominence score of a word in an item description may correspond to a significance of that word relative to other words in the same item description. For example, the most significant word in an item description may the headword, which may be one or more words that provide the most basic description of a corresponding item. Alternatively and/or additionally, less significant words in the search phrase may relate to attributes of the item. It should be appreciated that the prominence score for the words in an item description may be determined using any technique including, for example, crowd sourcing, machine learning, and/or the like.

In some example embodiments, the relevance score for an item description may correspond to a combined prominence score of the words in the item description that match a word in the search phrase. An item description may have a higher relevance score if the search description include words that match the more significant words from the item description which, as noted, may be associated with higher prominence scores. By contrast, an item description may have a lower relevance score if the search description include words that match less significant words from the item description (e.g., words associated with lesser prominence scores). As such, the search engine 110 may query the database 140 to return a certain quantity of matching item descriptions having a highest relevance score (e.g., item descriptions having the top n relevance scores). Alternatively and/or additionally, the search engine 110 may query the database 140 to return item descriptions having a relevance score that exceeds a threshold value. For example, the search engine 110 may query the database 140 to return item descriptions whose relevance score exceed the prominence score assigned to headwords. In doing so, the search engine may ensure that the item descriptions retrieved from the database 140 include headwords that match words appearing in the search description.

To further illustrate, the search engine 110 may receive, from the client 120, a search phrase that includes the string "Scandinavian cherry dining chair." As noted, the search engine 110 may preprocess the search phrase, for example, by tokenizing, cleaning, stemming, and/or lemmatizing the search phrase. The search engine 110 may further preprocess the search phrase by supplementing and/or replacing one or more words from the search phrase with synonyms and/or hypernyms, which may be more general than the original words. For instance, the search engine 110 may supplement and/or replace the word "cherry" with the word "wood." It should be appreciated that synonyms and/or hypernyms may be category dependent. For instance, while the word "cherry" may be supplemented and/or replaced with the word "wood" in the furniture category, the same word "cherry" may be supplemented and/or replaced with the words "stone fruit" in the produce and/or food category. Alternatively and/or additionally, the search engine 110 may preprocess the search phrase by replacing incorrect words with correct words.

In response to the receiving the search phrase "Scandinavian cherry dining chair" from the client 120, the search engine 110 may query the database 140 to return a list of matching item descriptions, which may be sorted based on a relevance score of each matching item description. For example, the search engine 110 may retrieve, from the database 140, a first item description including the string "Scandinavian cherry dining table," a second item description including the string "Scandinavian walnut dining chair," and a third item description including the string "walnut Biedermeier dining chair."

According to some example embodiments, each word in an item description stored in the database 140 may be associated with a prominence score. For instance, as table 300 in FIG. 3A shows, for the first search description, a prominence score of 100 may be assigned to the word "table," a prominence score of 3 may be assigned to the word "dining," and a prominence score of 1 may be assigned to each of the words "cherry" and "Scandinavian." Similarly, for the second search description, a prominence score of 100 may be assigned to the word "chair," a prominence score of 3 may be assigned to the word "dining," and a prominence score of 1 may be assigned to each of the words "walnut" and "Scandinavian." For the third search description, a prominence score of 100 may be assigned to the word "chair," a prominence score of 3 may be assigned to the word "dining," and a prominence score of 1 may be assigned to each of the words "walnut" and "Biedermeier." As noted, any technique may be applied to determine the prominence score of a word including, for example, crowd sourcing, machine learning, and/or the like. The prominence score of a word may correspond to a significance of the word to other words included in the item description phrase. For example, the word "chair" may be assigned the highest prominence score because the word "chair" is a headword providing the most basic description of the corresponding item. By contrast, the words "dining," "cherry," and "Scandinavian" may be assigned lesser prominence scores because these words may merely relate to attributes of the item.

As noted, the search engine 110 may query the database 140 in order to retrieve, from the database 140, a list of one or more item descriptions matching the search phrase, which may be sorted based on the relevance score of each of the matching item descriptions. The relevance score for a matching item description may correspond to a combined prominence score of the words in the item description that match a word from the search phrase. Thus, in the example shown in FIG. 3, the first item description may have a relevance score of 5 because the first item description includes the matching words "Scandinavian," "cherry," and "dining." The second item description may have a relevance score of 104 because the second item description includes the words "Scandinavian," "dining," and "chair." Meanwhile, the third item description may have a relevance score of 103 because the third item description includes the matching words "dining" and "chair."

In some example embodiments, the search engine 110 may query the database 140 to return a certain quantity of matching item descriptions having a highest relevance score (e.g., item descriptions having the top n relevance scores). Alternatively and/or additionally, the search engine 110 may query the database 140 to return one or more matching item descriptions whose relevance score exceeds a threshold value. For example, the search engine 110 may query the database 140 to return matching item descriptions whose relevance score exceed the prominence score assigned to the headwords appearing in each item description (e.g., 100), thereby preventing the database 140 from returning item descriptions whose most significant word (e.g., headword) does not appear in the search phrase. Accordingly, the result of querying the database 140 may include the second item description and the third item description because the second item description and the third item description each include the matching headword "chair" and therefore have relevance scores that exceed the threshold value. The result of querying the database 140 may exclude the first item description because the relevance score of the first item description does not exceed the threshold value. It should be appreciated that even though the first item description may include a larger quantity of matching words than the third item description, the result of querying the database 140 may nevertheless include the third item description but not the first item description because more significant words from the third item description appear in the search phrase. However, when two item descriptions have the same relevance score, the database 140 may be configured to select between the two item descriptions by at least selecting the item description having a larger quantity of matching words.

Figure 2:
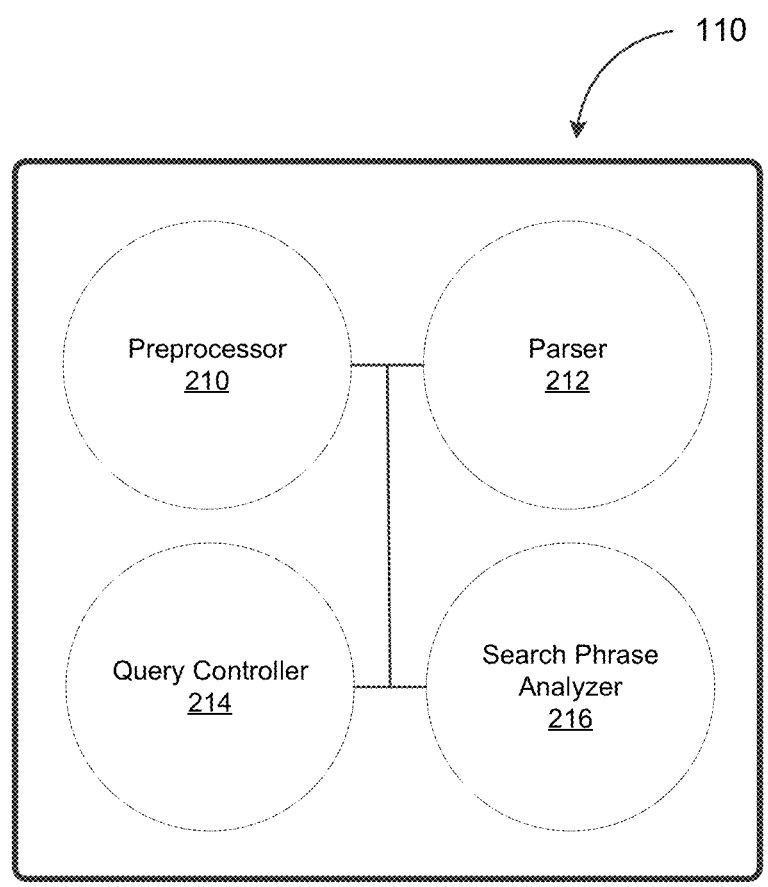
FIG. 2 depicts a block diagram illustrating a search engine, in accordance with some example embodiments.

FIG. 2 depicts a block diagram illustrating the search engine 110, in accordance with some example embodiments. Referring to FIGS. 1-2, the search engine 110 may include a preprocessor 210, a parser 212, a query controller 214, and a search phrase analyzer 216. It should be appreciated that the search engine 110 may include additional and/or different components than shown.

In some example embodiments, the preprocessor 210 may be configured to preprocess a search phrase received from the client 120. For instance, the search engine 110 may receive, from the client 120, the search phrase "cherry Scandinavian dining chair." The preprocessor 210 may respond to the receipt of the search phrase by preprocessing the search phrase "cherry Scandinavian dining chair." The preprocessing of the search phrase may include tokenizing the search phrase to individual words and cleaning the search phrase, for example, to remove stop words, numerical digits, non-alphabet symbols, and/or the like. The preprocessing of the search phrase may also include replacing incorrect words with correct words identified, for example, by applying a distance algorithm (e.g., Levenstein distance and/or the like) to the incorrect words. Alternatively and/or additionally, the preprocessor 210 may preprocess the search phrase by lemmatizing the search phrase to eliminate multiple variations (e.g., inflected forms and/or the like) of the same word. According to some example embodiments, the preprocessing of the search phrase may further include supplementing and/or replacing one or more words from the search phrase with synonyms and/or hypernyms, which may be more general than the original words. It should be appreciated that the preprocessor 210 may identify synonyms and/or hypernyms based on the category of the original words. For instance, while the word "cherry" may be supplemented and/or replaced with the word "wood" in the furniture category, the same word "cherry" may be supplemented and/or replaced with the words "stone fruit" in the produce and/or food category.

In some example embodiments, the parser 212 may be configured to determine and assign a prominence score to each word appearing in an item description. For instance, as shown in FIG. 3, the parser 212 may, for the first item description, assign a prominence score of 100 to the word "table," a prominence score of 3 to the word "dining," a prominence score of 1 to the word "cherry," and a prominence score of 1 to the word "Scandinavian." It should be appreciated that the parser 212 may apply any technique in order to determine the prominence score of a word including, for example, crowd sourcing, machine learning, and/or the like. Moreover, as noted, the prominence score of a word may correspond to a significance of the word in relation to other words included in an item description. For example, the parser 212 may assign the highest prominence score to the headword of the item description (e.g., "table"), which provide the most basic description of the item. By contrast, the parser 212 may assign lesser prominence scores to other words (e.g., "dining," "cherry," and "Scandinavian"), which may merely relate to attributes of the item.

In some example embodiments, the query controller 214 may be configured to query the database 140 to retrieve, from the database 140, one or more item descriptions that match the search phrase received from the client 120. For instance, the query controller 214 may query the database 14 in order to retrieve a list of item descriptions that match the search phrase "cherry Scandinavian dining chair. As noted, the query controller 214 may query the database 140 by at least sending, to the database 140, one or more structured query language (SQL) statements, graph query language statements, and/or the like. By querying the database 140, the query controller 214 may retrieve, from the database 140, a list matching item descriptions including, for example, the first item description "Scandinavian cherry dining table," the second item description "Scandinavian walnut dining chair," and/or the third item description "walnut Biedermeier dining chair." The list of matching item descriptions may be sorted based on the relevance score of each matching item description. Moreover, the list of matching item descriptions may exclude item descriptions whose relevance score does not exceed a threshold value and/or is not part of a certain quantity of matching item descriptions having the highest relevance scores. To further illustrate, FIG. 3B depicts a table 310 illustrating a search result, in accordance with some example embodiments.

In some example embodiments, the search phrase analyzer 216 may be configured to perform, based at least on the matching item descriptions retrieved from the database 140, a semantic analysis of the search phrase. For example, the search phrase analyzer 216 may identify, based at least on the prominence score of the matching words in each item description retrieved from the database 140, which words in the search description may be headwords and which words in the search description may relate attributes. To further illustrate, FIG. 3C depicts a table 320 illustrating a result of performing semantic analysis on a search phrase, in accordance with some example embodiments.

Figure 4:
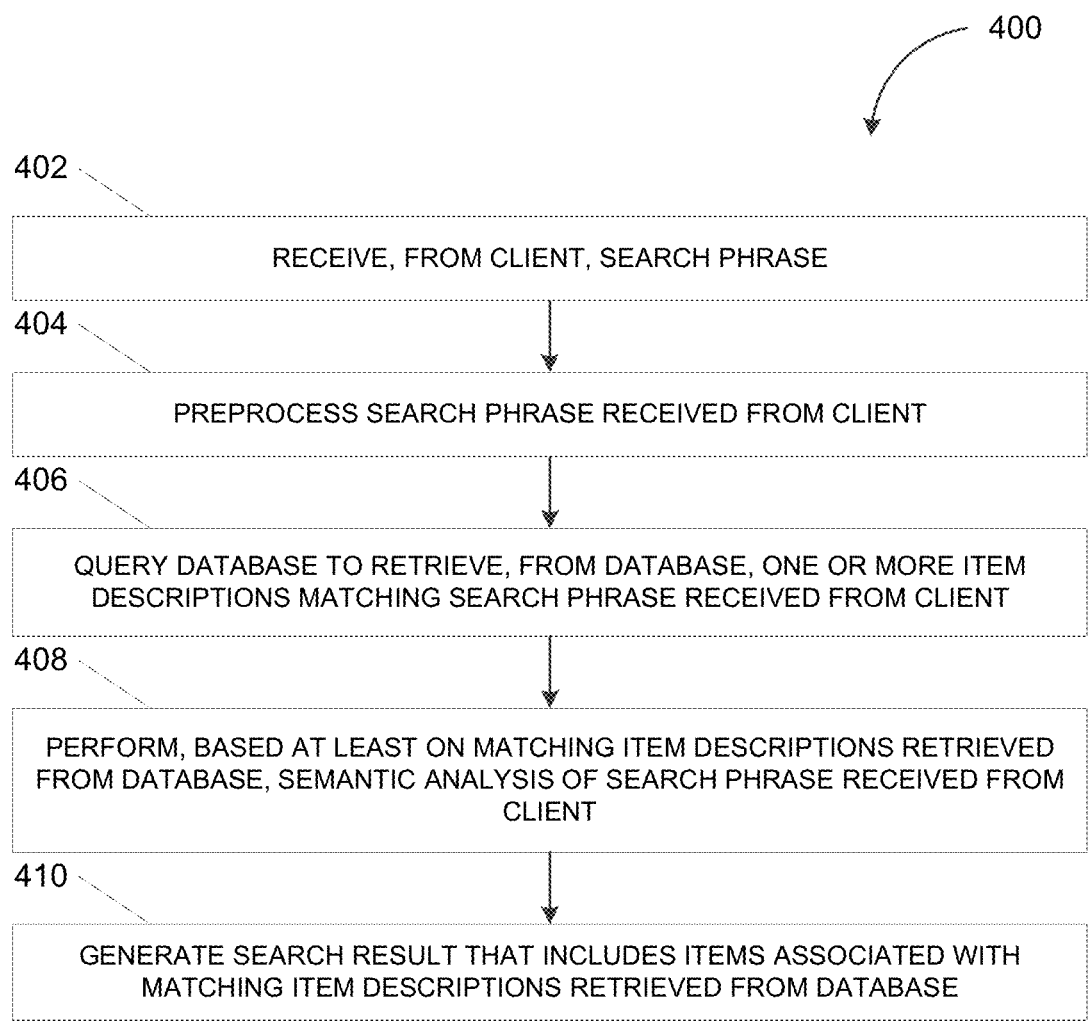
FIG. 4 depicts a flowchart illustrating a process for performing a search, in accordance with some example embodiments.

FIG. 4 depicts a flowchart illustrating a process 400 for performing a search, in accordance with some example embodiments. Referring to FIGS. 1-4, the process 400 may be performed by the search engine 110.

At 402, the search engine 110 may receive, from the client 120, a search phrase. For example, as shown in FIG. 1, the search engine 110 may be coupled with the client 120 via the network 130, which may be any type of wired and/or wireless network including, for example, a public land mobile network (PLMN), a local area network (LAN), a wide area network (WAN), a virtual local area network (VLAN), the Internet, and/or the like. The search engine 110 may receive, from the client 120, a search phrase that includes the string "cherry Scandinavian dining chair."

At 404, the search engine 110 may preprocess the search phrase received from the client 120. In some example embodiments, the search engine 110, for example, the preprocessor 210 may preprocess the search phrase "cherry Scandinavian dining chair." The preprocessing of the search phrase may include tokenizing the search phrase to individual words and cleaning the search phrase, for example, to remove stop words, numerical digits, non-alphabet symbols, and/or the like. Alternatively and/or additionally, the preprocessing of the search phrase may include lemmatizing the search phrase to eliminate multiple variations (e.g., inflected forms and/or the like) of the same word. As noted, the preprocessing of the search phrase may further include supplementing and/or replacing one or more words from the search phrase with synonyms and/or hypernyms, which may be more general than the original words. The preprocessing of the search phrase may also include replacing incorrect words with correct words identified, for example, by applying a distance algorithm (e.g., Levenstein distance and/or the like) to the incorrect words.

At 406, the search engine 110 may query the database 140 in order to retrieve, from the database 140, one or more item descriptions matching the search phrase received from the client 120. In some example embodiments, the search engine 110, for example, the query controller 214, may query the database 140 by at least sending, to the database 140, one or more structured query language (SQL) statements, graph query language statements, and/or the like. For example, the search engine 110 may query the database 140 to retrieve, from the database 140, the first item description "Scandinavian cherry dining table," the second item description "Scandinavian walnut dining chair," and the third item description "walnut Biedermeier dining chair." The first item description, the second item description, and the third item description may match the search phrase by including at least one word that match a word appearing in the search phrase. Moreover, the database 140 may be queried to return a list of matching item descriptions, which may be sorted based on the respective relevance score of each matching item description. As noted, the relevance score for an item description may correspond to a combined prominence score of each word in the item description that match a word in the search phrase. Meanwhile, the prominence score of a word in an item description may correspond to a significance of that word relative to other words in the same item description. Accordingly, the list of matching item descriptions retrieved from the database 140 may include the second item description at the top because the second item description is associated with the highest relevance score.

In some example embodiments, the search engine 110 may query the database 140 to return a certain quantity of matching item descriptions having a highest relevance score (e.g., item descriptions having the top n relevance scores). Alternatively and/or additionally, the search engine 110 may query the database 140 to return one or more matching item descriptions whose relevance score exceeds a threshold value. For example, the search engine 110 may query the database 140 to return matching item descriptions whose relevance score exceed the prominence score assigned to the headwords appearing in each item description (e.g., 100), thereby preventing the database 140 from returning item descriptions whose most significant word (e.g., headword) does not appear in the search phrase. Accordingly, the result of querying the database 140 may include the second item description and the third item description because the second item description and the third item description each include the matching headword "chair" and therefore have relevance scores that exceed the threshold value. However, the result of querying the database 140 may exclude the first item description because the relevance score of the first item description does not exceed the threshold value. It should be appreciated that relevance scores are independent of the quantity of matching words. Thus, even though the first item description may include a larger quantity of matching words than the third item description, the search engine 110 may nevertheless select the item associated with the third item description but not the item associated with the first item description because the third item description matched more significant words (e.g., "dining" and "chair") from the search phrase and is therefore associated with a higher relevance score than the first item description.

At 408, the search engine 110 may perform, based at least on the matching item descriptions retrieved from the database 140, a semantic analysis of the search phrase received from the client 120. In some example embodiments, the search engine 110, for example, the search phrase analyzer 216, may perform a semantic analysis of the search phrase by at least identifying, based at least on the prominence score of the matching words in each item description retrieved from the database 140, which words in the search description may be headwords and which words in the search description may relate attributes. An example of a result of performing semantic analysis on a search phrase is shown in table 320 of FIG. 3C.

At 410, the search engine 110 may generate a search result that includes items associated with the matching item descriptions retrieved from the database 140. In some example embodiments, the search engine 110 generate a result for the search phrase received from the client 120 that includes the items corresponding to the matching item descriptions retrieved from the database 140. Table 310 in FIG. 3B depicts an example of a search result, which may include items associated with different item descriptions, which may be retrieved from the database 140 based at least on the relevance score of the item descriptions in matching the search phrase. It should be appreciated that the search engine 110 may output, to the client 120, the search result in any manner including, for example, by generating a user interface (e.g., a graphic user interface and/or the like) for displaying the search results at the client 120.

Figure 5:
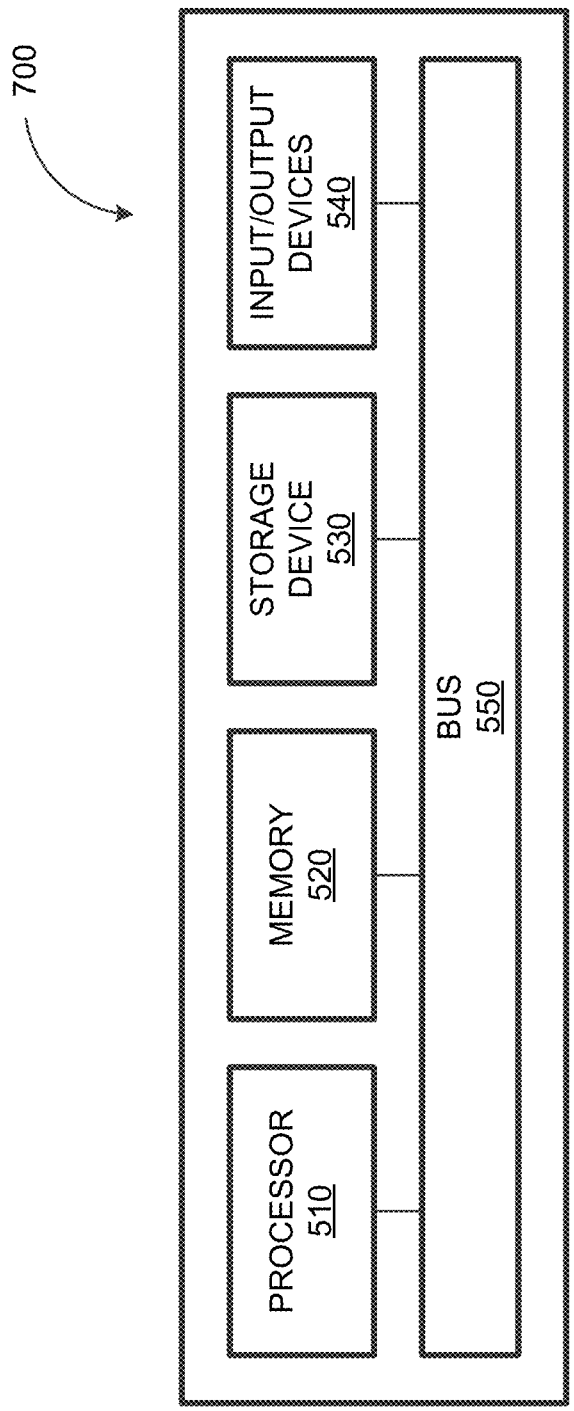
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the search engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the search engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid state drive, and/or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing items and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving, at a search engine coupled with a database, a search phrase;
   in response to receiving the search phrase, querying, by the search engine, the database to at least retrieve, from the database, one or more item descriptions matching the search phrase, the one or more item descriptions including a first item description based at least on a first relevance score of the first item description, the first relevance score of the first item description corresponding to a prominence score of each of one or more words in the first item description that also appear in the search phrase, the prominence score of each of the one or more words in the first item description corresponding to a relative significance of each of the one or more words, the one or more item description include the first item description but not a second item description based at least on the first relevance score of the first item description exceeding a threshold value and a second relevance score of the second item description not exceeding the threshold value, the threshold value being equal to and/or greater than a prominence score of assigned to a headword in at least one item description in the database, the headword of the at least one item description comprising a word having a greatest significance by at least providing a basic description of a corresponding item, and the threshold value being equal to and/or greater than the prominence score assigned to the headword in at least one item description in the database preventing the one or more item descriptions from including the at least one item description if the headword of the at least one item description does not appear in the search phrase; and
   generating, by the search engine, a user interface displaying a search result that includes items associated with the one or more item descriptions retrieved from the database.

2. The system of claim 1, wherein the one or more item descriptions include the first item description but not a second item description based at least on the first item description being one of a certain quantity of item descriptions in the database having a highest relevance scores and the second item description not being one of the certain quantity of item descriptions in the database having the highest relevance scores.

3. The system of claim 1, wherein the one or more item descriptions include the first item but not a second item description based at least on the first relevance score being equal to a second relevance score of the second item description and the first item description including a larger quantity of words matching the search phrase than the second item description.

4. The system of claim 1, wherein the database comprises a relational database, and wherein the search engine queries the database by at least sending, to the database, one or more structured query language (SQL) statements.

5. The system of claim 1, wherein the database comprises a graph database, and wherein the search engine queries the database by at least sending, to the database, one or more graph query language statements.

6. The system of claim 1, wherein the search phrase is preprocessed by at least eliminating variations of one or more words in the search phrase.

7. The system of claim 1, wherein the search phrase is preprocessed by at least replacing and/or supplementing a first word in the search phrase with a second word, and wherein the second word comprises a synonym and/or a hypernym of the first word.

8. The system of claim 1, wherein the search phrase is preprocessed by at least replacing an incorrect word in the search phrase with a correct word, and wherein the correct word is identified by at least applying, to the incorrect word, a distance algorithm.

9. A computer-implemented method, comprising:
   receiving, at a search engine coupled with a database, a search phrase;
   in response to receiving the search phrase, querying, by the search engine, the database to at least retrieve, from the database, one or more item descriptions matching the search phrase, the one or more item descriptions including a first item description based at least on a first relevance score of the first item description, the first relevance score of the first item description corresponding to a prominence score of each of one or more words in the first item description that also appear in the search phrase, the prominence score of each of the one or more words in the first item description corresponding to a relative significance of each of the one or more words, the one or more item description include the first item description but not a second item description based at least on the first relevance score of the first item description exceeding a threshold value and a second relevance score of the second item description not exceeding the threshold value, the threshold value being equal to and/or greater than a prominence score of assigned to a headword in at least one item description in the database, the headword of the at least one item description comprising a word having a greatest significance by at least providing a basic description of a corresponding item, and the threshold value being equal to and/or greater than the prominence score assigned to the headword in at least one item description in the database preventing the one or more item descriptions from including the at least one item description if the headword of the at least one item description does not appear in the search phrase; and
   generating, by the search engine, a user interface displaying a search result that includes items associated with the one or more item descriptions retrieved from the database.

10. The method of claim 9, wherein the one or more item descriptions include the first item description but not a second item description based at least on the first item description being one of a certain quantity of item descriptions in the database having a highest relevance scores and the second item description not being one of the certain quantity of item descriptions in the database having the highest relevance scores.

11. The method of claim 9, wherein the one or more item descriptions include the first item but not a second item description based at least on the first relevance score being equal to a second relevance score of the second item description and the first item description including a larger quantity of words matching the search phrase than the second item description.

12. The method of claim 9, wherein the database comprises a relational database and/or a graph database, and wherein the search engine queries the database by at least sending, to the database, one or more structured query language (SQL) statements and/or graph query language statements.

13. The method of claim 9, wherein the search phrase is preprocessed by at least eliminating variations of one or more words in the search phrase.

14. The method of claim 9, wherein the search phrase is preprocessed by at least replacing and/or supplementing a first word in the search phrase with a third word, and wherein the second word comprises a synonym and/or a hypernym of the first word.

15. The method of claim 9, wherein the search phrase is preprocessed by at least replacing an incorrect word in the search phrase with a correct word, and wherein the correct word is identified by at least applying, to the incorrect word, a distance algorithm.

16. A non-transitory computer readable storage medium storing instructions, which when executed by at least one data processor, result in operations comprising:

receiving, at a search engine coupled with a database, a search phrase;

in response to receiving the search phrase, querying, by the search engine, the database to at least retrieve, from the database, one or more item descriptions matching the search phrase, the one or more item descriptions including a first item description based at least on a first relevance score of the first item description, the first relevance score of the first item description corresponding to a prominence score of each of one or more words in the first item description that also appear in the search phrase, the prominence score of each of the one or more words in the first item description corresponding to a relative significance of each of the one or more words, the one or more item description include the first item description but not a second item description based at least on the first relevance score of the first item description exceeding a threshold value and a second relevance score of the second item description not exceeding the threshold value, the threshold value being equal to and/or greater than a prominence score of assigned to a headword in at least one item description in the database, the headword of the at least one item description comprising a word having a greatest significance by at least providing a basic description of a corresponding item, and the threshold value being equal to and/or greater than the prominence score assigned to the headword in at least one item description in the database preventing the one or more item descriptions from including the at least one item description if the headword of the at least one item description does not appear in the search phrase; and generating, by the search engine, a user interface displaying a search result that includes items associated with the one or more item descriptions retrieved from the database.

\* \* \* \* \*